United States Patent
Godowski et al.

(10) Patent No.: US 10,324,700 B2
(45) Date of Patent: Jun. 18, 2019

(54) STORING COMPUTING COMPONENT INSTALLATION INFORMATION

(71) Applicant: International Business Machines Corporation, Armonk, NY (US)

(72) Inventors: Piotr P. Godowski, Cracow (PL); Piotr Kania, Cracow (PL); Michal Paluch, Cracow (PL); Tomasz Stopa, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 15/064,929

(22) Filed: Mar. 9, 2016

(65) Prior Publication Data
US 2017/0262268 A1    Sep. 14, 2017

(51) Int. Cl.
*G06F 8/61* (2018.01)

(52) U.S. Cl.
CPC .  *G06F 8/62* (2013.01); *G06F 8/61* (2013.01)

(58) Field of Classification Search
CPC .................................................... G06F 8/61
USPC ......................................................... 717/174
See application file for complete search history.

(56) References Cited

U.S. PATENT DOCUMENTS

| | | | | |
|---|---|---|---|---|
| 6,117,187 A * | 9/2000 | Staelin | ...................... | G06F 8/61 717/169 |
| 7,529,945 B2 | 5/2009 | Eyres et al. | | |
| 2003/0137682 A1 * | 7/2003 | Sakai | ...................... | H04N 1/00 358/1.13 |
| 2004/0215754 A1 * | 10/2004 | Orleth | ................... | G06F 9/4411 709/223 |
| 2004/0250265 A1 * | 12/2004 | Suzuki | ...................... | G06F 8/62 719/321 |
| 2005/0102663 A1 * | 5/2005 | Fujii | ......................... | G06F 8/65 717/174 |
| 2006/0123413 A1 | 6/2006 | Collet et al. | | |
| 2006/0230397 A1 | 10/2006 | Cook et al. | | |
| 2009/0271607 A1 * | 10/2009 | Karve | ................... | G06F 9/5011 713/100 |
| 2011/0116126 A1 * | 5/2011 | Sumiuchi | .............. | G06F 3/1204 358/1.15 |

(Continued)

FOREIGN PATENT DOCUMENTS

WO         2010067266 A1     6/2010

*Primary Examiner* — Ziaul A Chowdhury
*Assistant Examiner* — Zengpu Wei
(74) *Attorney, Agent, or Firm* — Robert J. Shatto

(57) ABSTRACT

Installation information of a software component is received. The software component is software. The installation information includes an installation state for the software component, an identifier for the software component, a vendor of the software component, and a calendar date of the installation. The installation information is stored in a pseudo-permanent database. The record of the installation information in the pseudo-permanent database will survive the uninstallation of the software component. An update to the installation information is received in response to the installation state of the software component changing. The update includes modified installation information and a calendar date of when the installation information changed. The updated installation information is stored in the pseudo-permanent database.

14 Claims, 2 Drawing Sheets

(56) References Cited

U.S. PATENT DOCUMENTS

| | | | |
|---|---|---|---|
| 2011/0307958 A1* | 12/2011 | Ashton | G06F 21/105 |
| | | | 726/26 |
| 2012/0137281 A1 | 5/2012 | Kleiner et al. | |
| 2012/0210442 A1* | 8/2012 | Ito | G06F 21/10 |
| | | | 726/26 |
| 2013/0132942 A1 | 5/2013 | Wang | |
| 2014/0130176 A1 | 5/2014 | Fang et al. | |
| 2014/0237463 A1* | 8/2014 | Sriram | G06F 8/65 |
| | | | 717/172 |
| 2014/0344802 A1* | 11/2014 | Matov | G06F 8/61 |
| | | | 717/178 |
| 2015/0088942 A1* | 3/2015 | Shah | G06F 17/30238 |
| | | | 707/827 |
| 2016/0036667 A1* | 2/2016 | Kripalani | H04L 41/082 |
| | | | 709/224 |

\* cited by examiner

STORING COMPUTING COMPONENT INSTALLATION INFORMATION

BACKGROUND

Computer systems are becoming increasingly modular. Part of this increasing modularity is made with the attempt to become compatible with a greater array of third-party software. Over the lifetime of a computer system it is likely that the computer system will install a great number of individual computing components, whether new software or new physical components. Often computer systems will uninstall computing components once the components are no longer required or desired.

SUMMARY

Embodiments of the disclosure provide a method, system, and computer program product for storing software component installation information. Installation information of a software component may be received. The installation information may include an installation state for the software component, an identifier for the software component, a vendor of the software component, or a calendar date of the installation. The installation information may be stored in a pseudo-permanent database. The record of the installation information in the pseudo-permanent database may survive the uninstallation of the software component. An update to the installation information may be received in response to the status of the software component changing. The update may include modified installation information and a calendar date of when the installation information changed. The installation information may change as a result of the component being uninstalled, and therein the update may include the uninstallation date. The updated installation information may be stored in the pseudo-permanent database.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
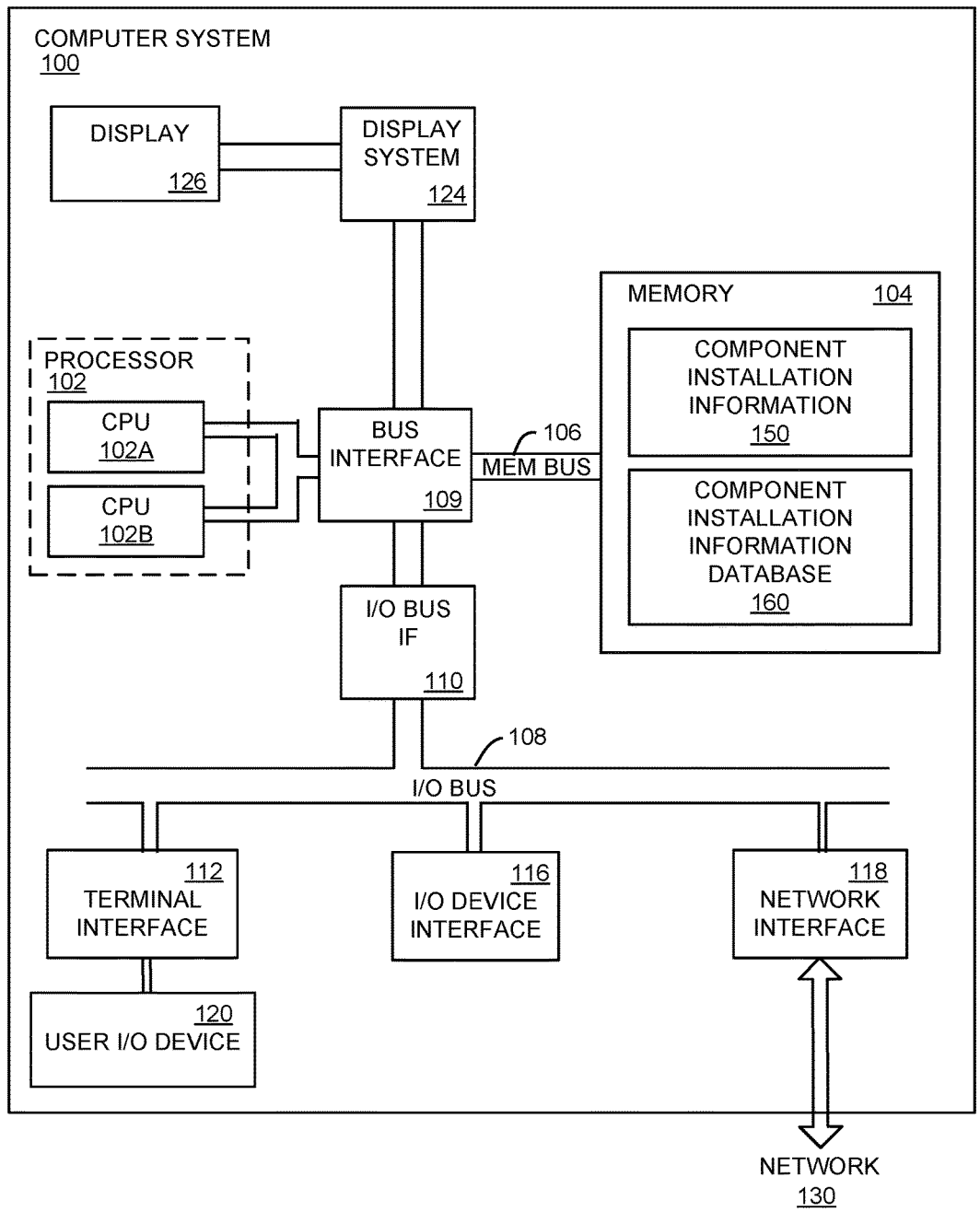
FIG. 1 is an apparatus for storing computing component installation information, according to embodiments.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to storing application installation information. Components are installed to a computer system. In response to this installation, data on the computing component is received. This data is stored in a long-term storage location. Any changes to the installation state of the computing component are recorded at the long-term storage location. The long-term storage location may be queried by such variables/predicates as component, vendor, installation date, or other factors to recall installation/uninstallation state across the life of a computer system. While the present disclosure is not necessarily limited to such applications, various aspects of the disclosure may be appreciated through a discussion of various examples using this context. Examples and example values discussed herein are provided by way of example only and are not to be construed as limiting.

In instances, a computing component is installed on a conventional computing system. The computing component will typically create and maintain a local registry of data on itself on the conventional computing system, including a data of install, vendor and license information, and any files required to properly run and track the computing component. In some instances, more data on installation is generated post-installation and therein not included in the local registry by conventional computing components, leading to incomplete installation information. For example, some applications generate applicable files after installation (e.g., an internal database, cache, logs, etc.). Registering this computing component in the conventional computing system may require providing a full and detailed list of files, and in many instances only an incomplete list can be found due to this fractured installation process, which may therein make attempts to register the computing component difficult or impossible. When the computing component is uninstalled, a conventional computing system allows the computing component to delete this local registry as part of a housekeeping process. If records of uninstalled computing components are required at any point in the future (e.g., if the conventional computing system is audited), this information may be difficult or impossible to gather.

Aspects of the disclosure are directed towards storing computing component installation information. When new computing component is installed, aspects of the disclosure are directed towards receiving information on the installed computing component. The information may be gathered and/or sent by operating system (OS) command or by application program interface (API). Aspects of the disclosure include two types of registration: full registration and light registration, as discussed in more detail below. Thus, in some embodiments, the amount and type of information that is gathered may change depending upon the type of registration that is selected (e.g., full registration vs. light registration).

The information may be stored in a binary database. By storing the information in a binary database, it may be more difficult for the computing component to detect and therein delete installation information in response to the computing component being uninstalled. If the installation state of the computing component changes, such as by the installation of a substantive update, the acquisition of a new license, or the uninstallation of the computing component, the installation state change is recorded in the database. The database may be pseudo-permanent in nature in that the data of the database will not be removed when the component is removed. In some embodiments, the data may be removed when it has passed a point of usefulness (e.g., for a computer system that undergoes audits that go back five years, the database may keep data for five years). In some embodiments the database is queryable. In such embodiments, a user may query the database to gather installation information data by searching for vendors (e.g., querying for all components made by ACME corp.), computing component class (e.g., querying for all printer components or all word processing components), or dates of install/uninstall (e.g., querying for any components installed during the calendar year 2004 and uninstalled during the calendar year 2008).

FIG. 1 depicts a high-level block diagram of a computer system 100 for storing computing component installation information. The components of the various embodiments disclosed herein apply equally to any appropriate computing system. The components of the example computer system 100 shown in FIG. 1 include a memory 104, a terminal interface 112, an I/O (Input/Output) device interface 116, and a network interface 118, all of which are communicatively coupled, directly or indirectly, for inter-component communication via a memory bus 106, an I/O bus 108, a bus interface unit 109, and an I/O bus interface unit 110.

The computer system 100 includes one or more general-purpose programmable central processing units (CPUs) 102A and 102B, herein generically referred to as the processor or processors 102. In some embodiments, the computer system 100 may contain multiple processors. In other embodiments, the computer system 100 may alternatively be a single CPU system. Each processor 102 executes instructions—such as the instructions from the component installation information feature 150 to perform the acts described with respect to method 200—stored in the memory 104.

In some embodiments, the memory 104 may include a random-access semiconductor memory, storage device, or storage medium (either volatile or non-volatile) for storing or encoding data and programs. The memory 104 can include stored data such as a database of component installation information 160 which contains up-to-date information on the installation state of computing components. Computing components may include new software installed in the memory 104. Computing components may also include physical components, such as hardware components depicted on FIG. 1.

In certain embodiments, the memory 104 represents the entire virtual memory of the computer system 100, and may also include the virtual memory of other computer systems coupled to the computer system 100 or connected via a network. In such embodiments, portions of the database 160 may be stored in other computer systems of the network 130, and the component installation information feature 150 may access the database 160 through the network interface 118.

The memory 104 may store all or a portion of the various programs, modules and data structures for storing component installation information as discussed herein. For instance, the memory 104 can include the OS that runs on the computer system 100. The OS may detect the installation of any component to the computer system 100 and any change of installation state of said components. For example, the OS could detect that an application is installed in the memory 104 and an I/O device (e.g., a printer) is installed using the I/O device interface 116. The OS may send data of this installation to the component installation information feature 150 to store in the database 160. In some embodiments, the component installation information feature 150 may be a feature of the OS. In this embodiment, the component installation information feature 150 includes instructions or statements that execute on the processor 102 to carry out functions (e.g., the acts of method 200) as further described below. For example, the OS may detect that the software is utilizing a new annual license and the printing device has been uninstalled, in response to which the component installation information feature 150 may update the two respective entries in the database 160.

In the depicted embodiment, the computer system 100 includes a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126, such as a standalone display screen, computer monitor, television, or a tablet or handheld device display. The display device 126 may display component installation information as stored in the database 160 and tracked by the component installation information feature 150. The display device 126 may display the results of any queries upon the database 160 that are executed by processors 102 on behalf of the component installation information feature 150, for which the display system 124 may include a dedicated memory for buffering video data.

In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A developer that is using the component installation information feature 150 may enter a query using an input device. For example, a computer system 100 which includes an I/O device 120 of a keyboard may allow a user to type in a query directed at the database 160 for I/O devices (e.g., devices connected to the I/O device interface 116) that were categorized as type "printer", were installed between Jan. 1, 2010 and Jan. 1, 2011, and were made by ACME corp. The processor 102 may execute this query entered via the keyboard 120 on the component installation information feature 150 to return, for example, two printers that were both installed on Mar. 3, 2010 and uninstalled on Apr. 4, 2011. Data on these two printers may be displayed on the display 126 for the user. In other embodiments, queries for the database 160 may be entered onto separate computer system on the network that is analogous to computer system 100, and such queries may be submitted to the component installation information feature 150 through the network interface 118.

The I/O device interface 116 provides an interface to any of various other I/O devices or devices of other types, such as printers or fax machines. The network interface 118 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

FIG. 1 depicts several example components of the computer system 100. Different embodiments of the present disclosure could track installation information of each of these components via the component installation information feature 150. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
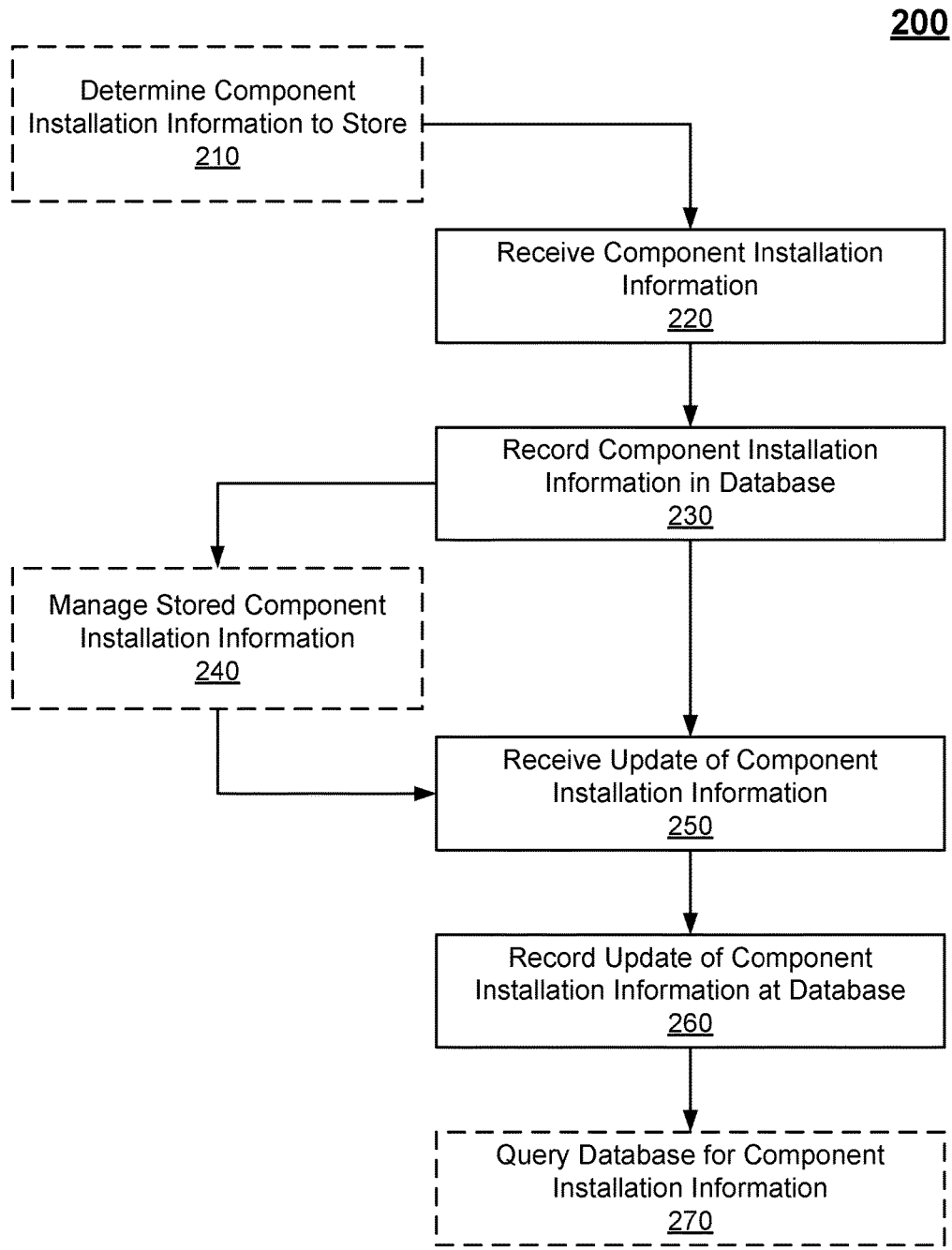
FIG. 2 is a method of storing computing component installation information, according to embodiments.

FIG. 2 is a flowchart illustrating a method 200 for storing computing component installation information. The computing components may be a software component. Blocks with hashed lines in FIG. 2 are optional steps within method 200. The visual arrangement of blocks in the flowchart of FIG. 2 is not to be construed as limiting the order in which the individual acts/operations may be performed, as certain embodiments may perform the operations of FIG. 2 in alternative orders.

At block 220 installation information of the computing component is received. Installation information includes such information as the date of installation, an identifier for the computing component (hereinafter referred to as the component), license information if applicable, and vendor information. The component installation information is received in response to the component being installed. The component may be received by application programming interface (API) or OS command. The API may allow registering the component from the level of the component, regardless of what level this is, as understood by one skilled in the art. For example, component installation information could be received using the API from the Java level when a computing component is a software application using Install Anywhere installers. In some embodiments, non-native component installation information may be received via API without preparing native software packages (e.g., fake or empty native software packages).

The installation information may be received by an installation controller that manages the intake, store, and/or query of installation information as described herein. The installation controller may be on the computer system that installed the component. The installation controller may be a feature of an OS. Specifically, the installation controller may be an "add-on" to a current known solution, such as Red Hat Package Manager (RPM) registry on Linux OS.

The amount of information that is received may be altered to be either a "full" registration or a "light" registration. Whether to gather information for a full or light registration may be determined at block 210. Full registration may include the native package of the component and the complete list of files for the component, as is gathered for RPM registration. The complete list of files may include a list of file paths where the file paths are stored within a registry as references (e.g., addresses) of the actual files on a hard drive disk. Put differently, the complete list of files may include a list of the location of all files of a component rather than the content of all files of a component. A native package may be a software component that is designed and configured specifically and exclusively for the OS of the computer that component is installed to.

Alternatively, light registration does not include gathering the native package and the complete array of files. A system employing light registration when gathering installation information will only gather a subset of "core" information, such as an identifier for a component, the vendor of a component, the date of installation of a component, and/or license information of a component. While a set of installation information that is gathered using light registration will not include all relevant data of the respective component (e.g., the installation information will not include native package and a complete array of files), the system may see performance benefits as a result of gathering and storing this set of installation information using light registration.

At block 230 the initial installation information is recorded in a database. The database is pseudo-permanent storage such that the installation information will remain in the database after the component is uninstalled. In some embodiments, the installation information may be available for as long as such information will be useful. For example, if component installation information is required for each year for any tax purposes, the pseudo-permanent nature of the database may include the database retaining all data for at least 12 months (e.g., the time it takes to file taxes) or four years (e.g., one year to file taxes and three years for the statute of limitation for tax laws). Alternatively, if component installation information is required for audits over the lifetime of computer systems, then the pseudo-permanent nature of the database may include all data of the database being maintained for the lifetime of the computer system.

In some embodiments, data of the database is stored in binary. By keeping data of the database in binary, the installation information of the database may be more secure, as it is more difficult for components to search through the system to find installation information to delete in response to said components being uninstalled.

In some instances, software and hardware may be related. For example, a new speaker may be installed, and the speaker may require the installation of support software. Such dependencies and requirements may be recorded in the database. A query for any component of a set of related components may return information on all components of the set.

At block 240 the stored installation information is managed. Managing the installation information may include managing the licenses of the components of the database. For example, the installation controller may use the API to register components with vendors to be used to track version control and updates of components. Management of installation information may include managing components from a current state of components (e.g., the current license and version of a component) or from a historical state of components (e.g., the trend of a series of licenses and versions of a component). For example, if an installation controller manages component installation information from a historical state, the installation controller may regularly communicate regarding components using APIs by including historical dates of the component (e.g., including start and end dates of licenses and versions).

Additionally, the installation controller may detect that the license of a component of a set of related components has expired. In response to detecting this expired license, the installation controller may use the API and/or analog commands to unregister the other components of the set of related components. For example, a computer system may have a malware application and an associated file-keeping application. The installation controller may detect from the database that the license of the malware application has expired. In response to this detection, the installation controller may act to uninstall the malware application and/or the file-keeping application, or the installation controller may act to communicate with the vendor of the malware application and/or the file-keeping application to unregister these components.

At block 250 an update to the initial installation information is received. The update includes data that alters or amends data already in the database. The updated component installation information may be received in response to the installation state of the component changing, as detected by the OS or another application of the computer. The change may relate to any facet of the component that is recorded in the database, such as the component being installed or uninstalled, the current license of the component, or the current version (e.g., software version 2.5 versus software version 3.0) of the component.

The updated component installation information may be received by API or OS command as described herein. In some embodiments, the installation controller may detect the updated information. For example, a new external hard drive and associated software may be installed, leading to date, vendor, component identifier (e.g., a model number), and license data for both the software and the hard drive being recorded at block 230. A feature of the computer (e.g., the OS) may detect that some aspect of this information has been updated, such as the hard drive being uninstalled, the license being renewed, or the software being updated to a new version.

At block 260 the updated component installation information is recorded. The updated information may include the date at which the installation information of the component changed. The updated information may be recorded at the same location at which the initial installation information was recorded. In some embodiments, the updated information may overwrite the original installation information, such that the database only contains the updated component installation information. In other embodiments, the database may add new fields for the respective component, such that both the original component installation information and the updated installation information is in the database. In such embodiments, the database may add such new fields for each update so that a record is kept of the modified installation information through time.

For example, to continue the embodiment above with the updated information on the hard drive and/or software, the installation controller update the records to reflect the changed installation information of the component. In some embodiments, the records for both the hard drive and for the software will be updated, regardless of which of the two components had the changing installation information.

At block 270 the database may be queried for component installation information. The query may be for the specific component (e.g., by model number), by vendor (e.g., all components made by ACME corp.), by date of installation or installation, or by other factors. The query may be close-ended (e.g., looking for a specific component that matches a unique identifier) or the query may be open-ended (e.g., looking for any component that has a general characteristic, such as being updated or installed during a certain time period).

The following paragraphs discuss an example embodiment of method 200 using a computer system with a Linux OS system configured to accept RPM packages. It is to be understood that the specific examples provided below are to be non-limiting, because other embodiments consistent with the disclosure are also possible. The Linux computer system has the capability to register/manage installation information using the new installation controller. The installation controller uses a new API or new OS commands to manage and/or register this installation information. While it is to be understood that both API and OS commands may be used in different embodiments, API is used for the rest of this example embodiment for clarity.

A new software component called PACKAGE XYZ is installed on May 5, 2015. The installed version of PACKAGE XYZ is version 7.1, and it comes from vendor ACME Corp. In this embodiment, the Linux computer system uses the Install Anywhere installer. Using the Install Anywhere installer, the software is registered in the native registry using the new API. A sample command to register the new software component is register_new_package('ACME Corp', 'PACKAGE XYZ', '7.1'). Registering the new software component in this way augments the current installation techniques and provides the registry with a more complete and comprehensive source of information regarding installed software, rather than a series of separate registries sorted by vendor as is commonly found in conventional computer systems.

The software component PACKAGE XYZ has sub-components which are also installed on May 5, 2015. These components are PACKAGE XYZ AGENT and PACKAGE XYZ SERVER, both of which can stand alone but in this example embodiment function mainly to support PACKAGE XYZ. Both sub-components may be made by vendor ACME Corp and version 7.1. These sub-components are registered in the native registry as discussed above. The sub-components are registered as relating to a single product to which they belong/are associated to. These new commands may be: bundle_to_product('ACME Corp', 'PACKAGE XYZ', ACME Corp', 'PACKAGE XYZ AGENT', '7.1'); bundle_to_product('ACME Corp', 'PACKAGE XYZ', ACME Corp', 'PACKAGE XYZ SERVER, '7.1').

The component PACKAGE XYZ SERVER may be upgraded to version 7.5 on Jun. 6, 2015. As such, the installer controller may register/store the upgrade. The commands to register this may be: register_new_package ('ACME Corp', "PACKAGE XYZ SERVER', '7.5'); bundle_to_product('ACME Corp', 'PACKAGE XYZ', ACME Corp', 'PACKAGE XYZ SERVER, '7.5'). A user may query the registry to get information about vendors, components, or installation periods. If a user searched by vendor (e.g., using a query of rpm -qa -type=vendor, vendor: ACME Corp) all three components would be returned. However, if a user only searches for an agent or server component, only the respective agent or server component would be returned.

The PACKAGE XYZ component and the AGENT and SERVER sub-components are uninstalled. All three are uninstalled on Feb. 2, 2016. On Mar. 3, 2016 the registry is queried for the components as described above. In conventional systems, no results may be returned. However, in this embodiment installation information may be returned. In this embodiment the user queries for the history of the components (e.g., using a query of rpm -qa -type=PACKAGE XYZ—history, vendor: ACME Corp). This query may return information that PACKAGE XYZ was installed on May 5, 2015 and uninstalled on Feb. 2, 2016, that PACKAGE XYZ AGENT was related to PACKAGE XYZ and was installed on May 5, 2015 and uninstalled on Feb. 2, 2016, and that PACKAGE XYZ SERVER was related to PACKAGE XYZ and was installed on May 5, 2015, upgraded on Jun. 6, 2015, and uninstalled on Feb. 2, 2016. As such, the native registry may be able to serve as a more reliable source of software compliance audit information. For example, when a company is undergoing an audit and needs to find software installed by ACME Corp. or Business Inc., (e.g., by using a query of rpm -qa -type=component -vendor='Business Inc.'-history the new capabilities and queries described herein may allow the company to find such information.

The functionality outlined in the discussions herein regarding FIG. 1 and FIG. 2 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for storing computing component installation information, the method farther comprising:
    selecting, by a computer system in response to an installation of a software component to the computer system, between fully registering the software component and partially registering the software component, wherein the computer system is capable of fully registering the software component, and wherein the computer system is capable of partially registering the software component;
    collecting, by one or more processors of the computer system, installation information for registering the software component, wherein an amount and type of installation information collected to register the software component is based on whether a full registration or partial registration of the software component is selected, and wherein the installation information includes at least an installation state for the software component, an identifier for the software component, a vendor of the software component, and a calendar date of the installation;
    storing the installation information in a pseudo-permanent database, wherein the installation information of the pseudo-permanent database will survive the uninstallation of the software component;
    receiving an update of the installation information of the software component in response to the installation state changing, wherein the update includes modified installation information and a calendar date of when the installation state changed; and
    storing the update of the installation information in the pseudo-permanent database, wherein storing the update includes storing both initial installation information and the update to the installation information,
    wherein the pseudo-permanent database is a binary database and both the installation information and the update to the installation information are stored in binary,
    wherein the fully registering the software component results in the installation information further including: a native package of the software component, and a complete list of files for the software component, and
    wherein the partially registering the software component results in the installation information including neither the native package of the software component nor the complete list of files for the software component.

2. The method of claim 1, wherein:
    the installation state changing includes uninstalling the software component.

3. The method of claim 1, further comprising:
    querying the pseudo-permanent database by one or more element of the installation information of the software component; and
    receiving all installation information of the software component.

4. The method of claim 1, where the selecting between fully registering the software component and partially registering the software component comprises: receiving a selection of a full registration of the software component; and determining, in response to the selection, to fully register the software component.

5. The method of claim 4, wherein the collecting the installation information for registering the software component includes:
    collecting, in response to determining to fully register the software component, the native package of the software component and the complete list of files for the software component,
    wherein the native package is a software package that is designed and configured for an operating system installed on the computer system, and
    wherein the complete list of files for the software component includes a list of locations for every file in the list of files, wherein each location identifies an address within a hard drive that stores a file for the software component.

6. The method of claim 5, the method further comprising:
    determining that the software component is associated with a hardware component, the hardware component being installed on the computer system;
    collecting installation information for the hardware component;
    storing, in the pseudo-permanent database, the installation information for the hardware component; and
    recording, in the pseudo-permanent database, an indication that the software component is associated with the hardware component.

7. The method of claim 6, the method further comprising:
    determining that the hardware component has been uninstalled from the computer system;
    Uninstalling, automatically and in response to determining that the hardware component has been uninstalled, the software component from the computer system; and
    updating the pseudo-permanent database to indicate that the hardware component and software component have been uninstalled from the computer system.

8. The method of claim 1, the method further comprising:
    installing a second software component on the computer system;

determining that the second software component is configured to support the software component;
bundling, in response to determining that the second software component is configured to support the software component, the second software component to the software component;
storing, in the pseudo-permanent database, installation information for the second software component;
recording, in the pseudo-permanent database, an indication that the second software component is bundled with the software component;
uninstalling, in response to a license of the software component expiring, the software component from the computer system;
detecting, using the pseudo-permanent database, that the second software component is related to the software component;
uninstalling, in response to detecting that the second software component is related to the software component and uninstalling the software component, the second software component from the computer system;
querying the pseudo-permanent database for one or more element of the installation information of the software component; and
receiving, in response to the querying, all installation information of the software component, the second software component, and a hardware component, the hardware component being related to the software component.

9. A computer system comprising:
a memory; and
one or more processing circuits communicatively coupled to the memory, wherein the one or more processing circuits are configured to:
select, in response to an installation of a software component to the computer system, between fully registering the software component and partially registering the software component, wherein the one or more processing circuits are capable of fully registering the software component, and wherein the one or more processing circuits are capable of partially registering the software component;
collect installation information for registering the software component, wherein an amount and type of installation information collected to register the software component is based on whether a full registration or partial registration of the software component is selected, and wherein the installation information includes at least an installation state for the software component, an identifier for the software component, a vendor of the software component, and a calendar date of the installation;
store the installation information in a pseudo-permanent database, wherein the installation information of the pseudo-permanent database will survive the uninstallation of the software component;
receive an update of the installation information of the software component in response to the installation state changing, wherein the update includes modified installation information and a calendar date of when the installation state changed; and
store the update of the installation information in the pseudo-permanent database, wherein storing the update includes storing both initial installation information and the update to the installation information,
wherein the pseudo-permanent database is a binary database and both the installation information and the update to the installation information are stored in binary,
wherein the fully registering the software component results in the installation information further including:
a native package of the software component, and
a complete list of files for the software component, and
wherein the partially registering the software component results in the installation information including neither the native package of the software component nor the complete list of files for the software component.

10. The computer system of claim 9, wherein:
the installation state changing includes acquiring a new license for the software component.

11. The computer system of claim 9, wherein the one or more processing circuits are further configured to:
query the pseudo-permanent database by one or more element of the installation information of the software component; and
receive all installation information of the software component.

12. A computer program product for storing software component installation information, the computer program product disposed upon a computer readable storage medium, the computer program product comprising computer program instructions that, when executed by a computer processor of a computer, cause the computer to:
select, in response to an installation of a software component to the computer, between fully registering the software component and partially registering the software component, and wherein the computer is capable of partially registering the software component;
collect installation information for registering the software component, wherein an amount and type of installation information collected to register the software component is based on whether a full registration or partial registration of the software component is selected, and wherein the installation information includes at least an installation state for the software component, an identifier for the software component, a vendor of the software component, and a calendar date of the installation;
store the installation information in a pseudo-permanent database, wherein the installation information of the pseudo-permanent database will survive the uninstallation of the software component;
receive an update of the installation information of the software component in response to the installation state changing, wherein the update includes modified installation information and a calendar date of when the installation state changed;
add new fields for the software component to the pseudo-permanent database;
store the update of the installation information in the new fields in the pseudo-permanent database, wherein the update is stored such that both initial installation information and the update to the installation information is in the pseudo-permanent database,
wherein the pseudo-permanent database is a binary database and both the installation information and the update to the installation information are stored in binary,
wherein the fully registering the software component results in the installation information further including:
a native package of the software component, and a complete list of files for the software component;

wherein the partially registering the software component results in the installation information including neither the native package of the software component nor the complete list of files for the software component;

identify, by an installation controller, a set of two or more related components installed on the computer;

determine, using the pseudo-permanent database, that a license of a first component of the set of related components has expired; and uninstall, by the installation controller and using an application programming interface (API), all components of the set of related components from the computer in response to determining that the license of the first component has expired.

13. The computer program product of claim 12, wherein: the installation state changing includes updating the software version of the software component.

14. The computer program product of claim 12, the computer program product further comprising instruction that, when executed by the computer processor, cause the computer to:

query the pseudo-permanent database by one or more element of the installation information of the software component; and receive all installation information of the software component.

* * * * *